United States Patent Office 2,827,386
Patented Mar. 18, 1958

2,827,386
METHOD OF MANUFACTURING CONCRETE

Robert F. Zimmerman and Elliott D. Becker, Cincinnati, Ohio, assignors to Pine Corporation, Cincinnati, Ohio, a corporation of Ohio No Drawing. Application February 4, 1954
Serial No. 408,302

5 Claims. (Cl. 106—98)

This invention relates to a method of hydrating dry or calcined Portland cement powder with water in order to provide a slurry which, when allowed to stand, is capable of hardening to a solid state. The slurries produced by this invention are adapted to be used either as neat cement, or in admixture with aggregate materials such as gravel, sand, slag, cinders, or the like to produce Portland cement concretes such as bulk cement or concretes adapted to be moulded into concrete blocks or the like. The slurries of the present invention have quicker setting or hardening characteristics than those which heretofore have been available, and are especially adapted for the production of high quality, high strength concretes in a convenient manner by the use of substantially lesser quantities of dry Portland cement than heretofore has been considered to be requisite.

Portland cement concrete conventionally is produced by admixing Portland cement powder or calcine, water, and aggregate materials such as sand and gravel in a concrete mixer which, typically, is a drum or barrel rotated at relatively slow speed wherein the materials are tumbled together and thereby commingled. The mixing usually is continued for a period of 2 to 4 minutes, after which the wet concrete is transported to the point of use where it is allowed to set and harden. A concrete mixture produced in this manner, when allowed to stand quiescently under normal temperatures will set or become immobile in a matter of 1½ to 2½ hours and will achieve its so-called design strength within a matter of 7 to 28 days, depending on whether normal or high early strength cement was used.

In Portland cement concretes, the cement component, when hydrated, functions as a binder for uniting the particles of aggregate to one another. It is recognized in the industry that the ratio of dry cement to water, the ratio of cement to aggregate, the type or kind of aggregate, the time of mixing, and other factors govern both the setting characteristics of the wet concrete mixture and also the strength which the hardened concrete will display, and standard specifications have been adopted by the industry setting forth the proportions of ingredients which are to be employed in the production of various concretes displaying predetermined properties for given uses. So-called "normal" Portland cements are commonly used in concrete making; but, when a concrete is desired which sets and displays strength within as short as possible a period of time after pouring, then so-called "high early strength" Portland cement is utilized. High early strength Portland cement, however, commands a considerable premium over the price of the normal product.

In the past it has been recognized that some of the dry Portland cement which is used in the making of a concrete mixture is not hydrated during mixing, but remains physically and chemically unchanged and, therefore, incapable of functioning as a binder for the aggregate. This cement is wasted in the sense that it is unable to contribute to the ultimate strength or to the settability of the concrete in which it is present. One reason which has previously been advanced to explain this undesirable result is that hydration of a particle or agglomeration of particles of dry cement commences as a surface phenomenon and tends to proceed inwardly, but that as a result of the hydration of the cement at or near the surface of the particle or agglomeration of particles a siliceous gel is formed which exerts an insulative effect retarding or preventing the continuance of hydration of the entirety.

Previously it has been suggested that a more complete hydration of the cement particles might be accomplished by ball-milling a mixture of cement and water, without aggregate, so as to physically remove gel from the cement particle surfaces and thereby re-expose them to further hydration. For example, by combining cement and water in a ball mill, then adding aggregate material thereto, it is said that concretes have been produced which display greater strength than concretes mixed in the conventional way. However, from a practical point of view, this procedure has never met with the success or utilization promised by its theoretical attributes. Perhaps one explanation for the commercial failure of the process has been the need for specialized, expensive, milling equipment such as ball mills or the like, and because of the impracticability of utilizing such equipment upon a production basis; a further reason which probably explains the unacceptability of this procedure is the undue amount of time required to conduct the process in equipment of normal size and capacity.

A principal objective of this invention has been to provide a process wherein Portland cement can be hydrated by dispersion with mechanical means in a brief period of time, in a simple and convenient manner, and at nominal cost. Otherwise expressed, a principal objective of this invention has been to provide a method for producing better concrete mixtures than have been produced conventionally in the past, and which are capable of setting or hardening and also of developing their design strength in a lesser period of time than heretofore has been possible in the use of normal or high early strength Portland cement admixed in the conventional way.

This invention, briefly, is predicated upon a series of discoveries and determinations which, by the use of inexpensive apparatus of nominal size, enable Portland cement either of the normal or high early strength type to be dispersed thoroughly and hydrated to completion or to a substantially greater degree than heretofore has been possible within a given period of time in conventional concrete mixers without using specialized cumbrous ball mills or the like. Essentially, in the practice of this invention, cement and water are mixed together, without aggregate, to provide a smooth, non-granular but gelatinous slurry constituting a dispersion of cement in water. This slurry is adapted to be mixed with aggregate material of any type in any suitable manner, as by hand, by means of a common concrete mixer or the like, or, if neat cement is desired, then the slurry is used as such for that purpose. The invention, however, is addressed particularly to the production of the slurry itself and to features which enable the production of high strength concretes from such a composition.

First, it has been discovered that by subjecting a mixture of dry Portland cement powder and water to the action of a rotary impeller operated at a relatively high rate of speed, the particles or agglomerations of cement can be dispersed throughout the water, brought into an intimate state of contact therewith, and distributed therein so that the cement becomes more thoroughly hydrated within a shorter period of time than heretofore has been possible.

Secondly, we have determined that in order to produce the conditions which are conducive to thorough distribution and hydration of the particles of cement by mixing in such manner, it is requisite that the slurry be of a relatively thick consistency. If the slurry, during mixing is too thin or too fluid, then desired mechanical working of the mixture, and the desired temperature increase, as subsequently explained, are not obtained. The invention, therefore, contemplates a controlled procedure wherein a rotary impeller or bladed mixing tool is operated at a relatively high rate of speed in a mixture of cement and water so as to disperse and distribute the particles of cement throughout the water as hydration proceeds and to coincidentally separate from the particles or prevent the formation thereon of a gel which would otherwise interfere with the completeness of their hydration.

By virtue of the greater degree of hydration of the cement which can be achieved in this manner, the strength of concrete obtained by incorporating aggregate into the slurry is commensurately increased, or conversely, a concrete having given strength characteristics can be produced using substantially less cement than heretofore has been considered requisite.

Next, the invention is directed to the discovery of a mixing procedure which enables concrete mixtures having improved qualities to be obtained by the use of smaller quantities of water than would be required according to conventional concrete making practice. Such concretes, moreover, may be of the relatively stiff or pasty type, having little or no so-called slump, adapted particularly for use in the moulding of concrete blocks, bricks, pipe or the like; or such mixtures may be of pourable consistency, possessing predetermined so-called slump characteristics adapting them for usage in reinforced building structures, roadways, or the like.

In respect to this feature of the invention, the use of a lesser amount of water in a given purpose concrete is permitted because of a peculiar change in the state of a slurry which is being mixed by a rapidly rotating impeller to effect the dispersion and hydration of cement. This change of state can best be explained in comparison with slow speed mixing.

When water and dry Portland cement powder are stirred together slowly in given proportions, the cement is crudely admixed with the water and becomes partially hydrated, but the viscosity of the slurry and the temperature thereof do not change immediately to any significant degree. However, when a mixture of similar proportions of cement and water is subjected to the action of a high speed rotary impeller, then, peculiarly, we have found that is is possible to cause the viscosity to be made to change at a rapid rate. For example, depending upon the proportions, the equipment and its speed, the consistency may be made to change from the state of a thin watery mixture to that of a thick cream or paste.

During mixing, unless checked or controlled, the temperature will increase as much as 50° F. or more, depending upon prevailing conditions. Part of the increase in temperature is attributable to the heat of hydration liberated through the change in the chemical state of the cement. The remainder of the heat which provides a temperature change is attributable to the heat of friction which attends the mechanical working of the slurry by the impeller. Since the mechanical friction incident to the rotation of the impeller in the mixture is related to the fluidity or the viscosity of the mixture, the temperature rise through heat of friction is greater the more viscous the slurry. In order that the impeller may work effectively upon the slurry to perform its function in a brief period of time, it is desirable, therefore, that the water admixed with the cement be limited in amount. For example, a ratio of approximately 1 pound of water to every 3 pounds of cement, or 3.7 gallons per 94 pound sack of cement has been found to be generally satisfactory at the start of slurry preparation. The water-cement ratio at the start of a slurry preparation should not substantially exceed approximately 4.2 gallons per 94 pound sack of cement (approximately 35 pounds per sack) otherwise the slurry will be too thin to be worked properly, and the desired viscosity change will not be obtained within a practical period of time. This upper limit is not precisely critical because cements vary in composition according to the processes by which they are produced in various cement mills, but is given as a general guide. On the other hand, if too little water is used in slurry preparation then the mixture cannot be worked without excessive power consumption, if at all. A minimum water content of approximately 3.2 gallons per 94 pound sack (approximately 27 pounds per sack) has been found to be satisfactory. Additional water is incorporated during slurry preparation as required, as subsequently explained.

The amount of water which is required to be present in a given concrete in order to impart a predetermined characteristic of pourability or mobility to that concrete is dependant upon the type and quantity of aggregate which is used, the temperature and humidity, the total water content, including the moisture content of the aggregate, and other factors. Since such factors vary widely in different geographical areas and with different types of aggregates, it is impossible to state exactly how much water is to be used in the preparation of a slurry which is subsequently to be employed in the making of a concrete of specified characteristics with an unknown aggregate. Now, to produce relatively stiff mixtures of the type especially suited for use in concrete block making, all, or substantially all, of the added water which will ultimately appear in the finished mixture may be present in the slurry at the start of the slurry operation. On the other hand, when a wetter concrete, that is, one having greater pourability or slump, is required, it is obvious that the use of a relatively low quantity of water at the start of slurry preparation as desired in order that a slurry of suitable thickness or viscosity may be established, will be inadequate to provide the intended mobility of the finished product. In other words, in order to make so-called slump concretes, one is confronted with the fact that the admixing of cement and water with a favorably low quantity of the latter so as to create a viscosity favoring the desired mechanical working action during high speed mixing, yields a slurry which is generally too thick to be admixed with a suitable quantity of aggregate to produce a distinctly pourable concrete.

In conventional concrete mixing, given amounts of cement, water, and aggregate are introduced into the mixer, and the slump is adjusted to the final condition by adding supplemental quantities of water during mixing. An important feature of this invention is based upon the discovery that the addition of a given amount of water to a slurry during its preparation has a far greater effect upon the mobility or slump of concrete which is later produced from that slurry than if the same amount of water were merely added to the aggregate or to the mixture of aggregate and slurry in the final concrete mixing step. This discovery enables both of the opposed requisites which have previously been discussed to be satisfied. In accordance with this invention, whatever water is required to produce a desired slump characteristic, over and above that amount of water initially used in the slurry preparation, is added to the slurry either in increments during the course of its preparation, or as a single addition at or about the time the mixing of the slurry is completed, whereby a finished slurry is produced having viscosity which, in relation to the amount and type of aggregate that is subsequently to be mixed in, will produce a concrete having the desired slump characteristics.

It is paradoxical that water added to the slurry during, at, or near the end of its preparation should have an entirely different effect upon the fluidity or slump of the concrete subsequently produced therefrom than water added in equal amount at the time the slurry and the aggregate are being mixed together. However, when the latter procedure is followed, an inordinately large amount of water is required to effect any appreciable change in slump, and the strength of such a concrete, when set and hardened is lowered so appreciably that the advantages offered by more complete hydration of the cement, as obtained in the intensive mixing of the slurry, is offset, so there is no over all net gain or commercial advantage. However, by introducing water into the slurry before the aggregate is present, the amount of water required to provide a given slump is substantially reduced, with no sacrifice in the strength of the concrete.

The reason for this pronounced difference in effect upon the change in mobility resulting from the incorporation of a given amount of water, depending upon whether it is added to the slurry or to the slurry-aggregate mixture, cannot fully be explained from the evidence available at present. However, it is believed that raw water, added when aggregate is present, functions primarily as an inert lubricating liquid which effects mobility only, whereas water which is added to a slurry at a time when the cement is undergoing hydration, functions not only as a liquid affecting viscosity, but as a chemical component which, under the temperature, agitation, and viscosity conditions then prevailing, changes the physico-chemical mechanism of cement hydration. In this respect, it must be remembered that Portland cements consist of calcium silicates and aluminates, but also contain gypsum added during cement manufacture as a retarding agent, and that during hydration, two states of chemical reaction occur. One of these involves the production of hydrous calcium aluminate; the other involves reaction of the latter with gypsum to produce sulpho-aluminate compounds. Apparently, a distinctly different balance in the concentrations of solutions or intermediate reaction products is obtained when water is added during intensive mixing of the slurry than when it is added at the time of mixing in the aggregate.

Moreover, the addition of water during slurry preparation exerts a quenching or lowering effect upon the temperature of the slurry; depending upon the amount added, the temperature is either reduced or at least further increase is discouraged. Our experience indicates that slurry temperatures may be allowed to reach 80 to 100° F. without adverse effects; in fact, gel formation seems to be increased in this temperature range, though the evidence is not conclusive. Water additions to the slurry during its preparation, therefore, enable a viscosity to be maintained which favors effective mechanical working so as to promote dispersion and hydration of the cement, but also enables a viscosity to be obtained which eliminates the necessity for subsequent addition of water when the aggregate is being mixed in.

The physical changes of state which occur during slurry preparation in accordance with this invention can be illustrated as follows: At, or soon after, the start of mixing of a slurry the cement is in a granular or agglomerated state and if the mixture is then allowed to stand, a noticeable settlement of cement will occur with the appearance of free, substantially clear water on the top. (This undesirable condition frequently is noticed even in concrete mixed in a conventional way.) However, further mixing of the slurry in accordance with this invention produces a progressive change in its viscosity so that at later states in the slurry mixing process, less and less free water or separated water will appear at the surface if the slurry is allowed to stand quiescently. Ultimately, a condition is reached wherein the slurry behaves as a colloidal gel from which there is no settlement of cement nor any separation of water. At this state the water apparently is combined with the cement or held firmly in the gel matrices. Even in this state, however, the gel is capable of accepting additional water with a resultant decrease in viscosity. Thus, as the viscosity tends to increase during mixing, once having reached some suitable state favoring working, it can be decreased by water addition, and the water added will be assimilated into the mixture without adversely affecting the strength of the concrete subsequently made therefrom, provided, of course, that the usual practical limit is observed.

From a theoretical point of view water additions to the slurry may be made in relation to viscosity change such that, once the slurry has achieved a desired viscosity, it may be maintained substantially uniformly thereafter. In a practical sense, however, this nicety of control is not essential in the production of concretes having greatly improved characteristics; as a matter of practice, if water must be added to produce the slump desired in the concrete, then one or two additions of water at or near the end of the slurry making step will suffice, the amount of water being added in relation to the existing viscosity of the slurry and in relation to the type of aggregate which is to be used, its moisture content, etc., so as to yield a finished product of the desired slump or stiffness and strength.

For preparing the slurry in order to work it effectively to promote hydration and dispersion of the cement particles, we have found that impellers of the type shown in United States Patent No. 2,351,492 are very suitable. Such an impeller consists of a flat disk having vanes extending laterally from one or both sides of the disk surface. The vanes are short and they may be curved with respect to the direction of rotation, such that a high degree of turbulence is created by the impeller when it is rotated in the slurry.

One or more impellers may be fastened to a shaft which is connected, directly or indirectly, to a drive motor for operation at peripheral speeds of 2000 to 14,000 feet per minute. For example, for making small batches of slurries, an impeller of 8" diameter, operated at 2400 R. P. M. is convenient to use in conjunction with a 3 horsepower motor, while impellers of considerably larger diameter, such as 12 to 15 inches or more, operated at higher speeds are convenient for large scale production. For simple operations the impeller may be introduced into a tank in which the slurry is to be mixed, the impeller preferably being spaced from, but positioned adjacent the bottom of the tank. During prolonged use the vanes of the impellers are worn away through the abrasive action of the cement, but the impellers are conveniently replaceable at low cost. It is apparent, therefore, that the equipment utilized to produce slurries according to the present invention is exceedingly simple. For mixing in the aggregate with the slurry a conventional concrete mixer or other suitable apparatus may be employed.

EXAMPLE 1

The following data illustrate the progressive change in the viscosity of a slurry of cement and water during mixing with apparatus of the type just described, the particular impeller in this case being 6 inches in diameter with 15 vanes operated at a speed of 3600 R. P. M. in the center of a round tank 13¾ inches in diameter: Ninety-four pounds of dry Portland cement and 29.0 pounds of water are added to a tank, the cement preferably being added progressively while the impeller is rotating. All of the cement may be added in the water in a period of approximately one minute or less. At this time the gravity flow viscosity is approximately 4 inches. The temperature of the slurry according to this example is 70° F. The temperature of the water before addition of any cement was 72° F., and the temperature of the dry Portland cement was 52° F.

After mixing for one minute the temperature of the slurry increased to 74° F. and the viscosity increased to 4¹⁄₁₆ inches.

| After Mixing | Temperature, °F. | Viscosity, inches |
|---|---|---|
| 2 Minutes | 83 | 4½ |
| 3 Minutes | 90 | 4⅝ |
| 4 Minutes | 96 | 4¾ |
| 4 Minutes, 40 Seconds | 102 | 4⅞ |

The viscosity of the slurry which is identified in the preceding data, and which is referred to at later points in the specification, is determined by the following test: A standard 4 inch ASTM cone is rested upon a flat level surface, and the cone is then filled to the top with slurry. Then the cone is lifted permitting the slurry to run outwardly over the table surface, and the viscosity referred to is the average diameter of the base of the pile of slurry after the cone has been removed.

Thus, over a period of less than 5 minutes during mixing of the slurry, the temperature increased 28° F. and the viscosity has changed from that of a watery crude mixture to that of a relatively fine dispersion with little free water. The creamy consistency of the slurry renders it too thick to be admixed directly with aggregate in the usual ratio unless a very stiff concrete is desired. However, concretes of stiff consistency are desired in the manufacture of concrete blocks and other moulded products, and one of the features of this invention, discussed in more detail at a later point, concerns that production. On the other hand, when so-called slump concretes are to be prepared more water is requisite.

EXAMPLE 2

The following example illustrates one typical practice of the present invention in the production of a so-called slump concrete:

(a) Dry Portland cement 37.6 pounds, and water 12.5 pounds are placed in a tank equipped with a rotary impeller of the type shown in the aforesaid United States patent. After operating the impeller for a brief period, e. g. 3 minutes, a sample taken from the mixture showed a viscosity of 6⅛ inches and the temperature of the mass at that time was 74° F. One pound of water was then added to the slurry. This reduced the viscosity thereof to 7 inches and the temperature to 73° F. During two more minutes of mixing the viscosity increased to 7¼ inches, the temperature to 75° F., and at that time an additional one pound of water was added. This reduced the slurry viscosity to 8¼ inches and the temperature to 74° F.

After two more minutes of mixing (7 minutes from the start of mixing) the viscosity was 8 inches, the temperature 79° F., and then two more pounds of water were added. This produced a viscosity of 9¼ inches and the final temperature was 76° F. (The temperature of the water added to the slurry was the same as the temperature of the water initially admixed with the cement.)

This slurry was then mixed in a conventional concrete mixer with aggregate consisting of gravel, torpedo gravel, and coarse and medium sand, totalling 355 pounds on a bone dry basis, but containing 22 pounds of absorbed water as used.

The slurry-aggregate mixture produced a concrete having no significant slump when tested according to the standard ASTM slump procedure. Five pounds of water was required to be added to the aggregate-slurry mixture in the concrete mixer in order to produce a slump of 1⅛ inches.

(b) In contrast, a slurry of cement and water of similar proportions and mixed in the same manner as in the preceding example, but with 4 pounds of water instead of 2 added as the last slurry addition, when mixed with aggregate of the same type and in the same proportion as in the preceding example (a), produced a concrete having a slump of 2½ inches. Thus, 5 pounds of water added in the mixer had much less effect upon the mobility of the concrete than only two additional pounds of water added to the slurry.

The slump of the concrete as discussed in this and succeeding examples is measured according to the standard ASTM Slump Test, viz.: A standard slump cone, which is 12 inches high is rested upon a flat level table and is filled to the top with concrete, the slump of which is to be determined. Then, after the concrete is rodded, the cone is lifted and the column of concrete subsides, the amount depending upon consistency. The slump of the concrete is identified as the amount of vertical fall of the concrete from the top level of the cone to the level to which the concrete has subsided when the cone is removed.

EXAMPLE 3

The effect of water additions in accordance with the present invention, in comparison with the effect of water admixed according to conventional concrete making procedure is illustrated in terms of strength, by the following:

(a) A slurry was prepared using a starting ratio of water to dry Portland cement of one part to three by weight. However, in this case the ratio of aggregate to cement was increased (355 pounds aggregate on a bone dry basis to 37.5 pounds of cement) to illustrate the effect on strength of the use of a lesser quantity of cement. Thus, in this composition approximately 20% less cement was used than is common in conventional procedure. The total water content of the concrete produced in this manner, including absorbed moisture in the aggregate, was 42.8 pounds, and the concrete had an ASTM slump of 4 inches. The 7 day strength of this concrete was 2,250 pounds p. s. i., and the 28 day strength 3,800 pounds p. s. i.

(b) Using the same proportion of aggregate to cement, but mixing them together in a concrete mixer according to conventional practice, a total water content of 46 pounds was required to produce a 4 inch slump. The concrete prepared in this manner had a 7 day strength of only 1,880 pounds p. s. i., and a 28 day strength of only 3,100 pounds.

In similar comparative tests, 37.8 pounds of water (total) was required in conventional concrete mixer procedure to produce a slump of approximately 3 inches, and the concrete when hardened showed a 7 day strength of 2,500 p. s. i., whereas only 34.7 pounds of water was required in the preparation of a concrete of otherwise the same cement-aggregate ratio, but with the water added during slurry preparation, and this concrete showed substantially the same slump as the other but had a 7 day strength of 3,228 pounds p. s. i. In this case, 15.5 pounds of water was mixed with 47.5 pounds of cement at the start of slurry preparation, 4 pounds was added all at once near end of mixing. The balance of the 34.7 total pounds of water was present as absorbed water in the aggregate. Similarly, using 37.6 pounds of water and 20% less Portland cement, produced a slurry which, when mixed with the same quantity and type of aggregate as before, yielded a concrete having a 3¼ inch slump, a 28 day test strength of 3,140 pounds.

In all of these data, the strengths stated are averaged strengths as determined by crushing 3 or more samples.

It is to be understood that materials such as cinders, slags, and various light weight compositions may be used as aggregate instead of the gravel previously mentioned. Since all aggregates vary as to moisture content from batch to batch and from type to type, it will be understood that the foregoing examples are only illustrative. Also dry Portland cements in and of themselves vary as to chemical composition and hydratability, depending upon the manufacturer and also whether they are of the normal type or of the high early strength type. It is particularly significant, however, that the crushing strengths displayed by concretes produced in accordance with the present invention are unusually high when conventional ratios are employed, and as much as 20% to 50% of the cement content can be eliminated in the production of concretes which will meet the usual specifications.

*Concrete blocks, bricks, etc.*

In the manufacture of concrete blocks and the like, a moulding process is employed wherein the Portland cement concrete is introduced into a mould or box of the desired shape, and tamped or vibrated, after which the mould is removed before the mass has set. The article is then conventionally cured by steam heat.

Such procedure inherently requires a concrete composition which is sufficiently stiff to be self sustaining when the mould box is removed. Conventionally, the concrete for concrete blocks is prepared in the usual concrete mixer, the aggregate, cement, and water all being introduced together for admixing. It is usual in this procedure for approximately 1½ to 3½ gallons of water per 94 pound bag of cement to be employed, depending on the nature and condition of the aggregate; more water makes the concrete too wet to be self sustaining.

Slurries produced in accordance with the present invention are particularly well adapted for use in the manufacture of such concrete shapes by moulding. One distinct advantage is conferred by the sticky, gelatinous nature of the slurry, adherence to the aggregate particles apparently coating them more effectively than they are coated when mixed with cement in a conventional way. This greater adherence and the resultant greater bonding strength which is obtained through improved hydration of the Portland cement enables a substantial amount of the cement to be eliminated without sacrifice in block strength.

EXAMPLE 4

(a) A typical commercial block plant procedure calls for three boxes of torpedo gravel, three boxes of sand, two boxes of screenings, and five sacks of Portland cement. Each "box" is a container measuring on the inside 21" x 21" x 28", and a sack of cement is a 94 pound sack. The water used in this particular procedure, 1½ gallons per sack, is the maximum amount which can be introduced without producing a mixture that is too fluid to be self sustaining after the moulds are removed. Actually, this amount of water and the mixing technique are incapable of hydrating all of the cement which is present; a substantial proportion of the cement in the mixture remains unhydrated, or imperfectly hydrated by this procedure. By this procedure approximately 27.4 blocks were made per sack of cement, the blocks having a crushing strength after 28 days of over 1,660 pounds per square inch, which was the limit of capacity of the testing machine used.

(b) To produce blocks in accordance with the present invention, a slurry is prepared using approximately 3.3 to 4.3 gallons of water per bag of cement. All of the water may be present at the start of slurry preparation, or if desired the necessary balance of water over the minimum may be added during slurry preparation. Either way, the proportion of water yields a slurry which, when admixed with aggregate of the same type and in the same proportion as before, produces a similarly self-sustaining concrete mixture. By this procedure, using aggregate as before, only 3 sacks of cement is required to serve the same amount of aggregate as previously used, and the yield is 37.4 blocks per sack. The blocks had a crushing strength after 28 days of over 1,600 pounds per square inch, which also was beyond the limit of capacity of the testing machine, as previously explained.

Thus, high strength blocks were obtained by the practice of the present invention with the utilization of a substantially smaller proportion of cement, and similarly, a substantially greater number of blocks were produced per bag of cement.

Various specifications have been established concerning block strength; for example, the Cincinnati Municipal Code specifies a block strength of 1,000 pounds p. s. i. after 28 days of maturing. Since the crushing strength exhibited in the tests just discussed were appreciably higher than this requirement, it is apparent that even less cement that that given in this example of the practice of the present invention may be used. To illustrate, 2½ bags of cement processed in accordance herewith, utilizing the same proportion of aggregate as before, enabled the production of 45.6 blocks per bag of cement. These blocks showed a crushing strength of 1,391 pounds p. s. i. after 28 days. Even this crushing strength exceeds the given code requirement by approximately 40%, indicating that a still smaller proportion may be used if desirable.

From the foregoing, it will be observed that moulded articles having a high strength are produced in accordance with the present invention, even though a substantially lesser quantity of cement is used than in conventional procedure. This fact is of great importance in respect to block stability after curing. Blocks manufactured conventionally, after curing and after being allowed to stand for 28 days had a moisture absorption of 7.5% as measured by the standard ASTM moisture absorption test. Blocks produced in accordance with the present invention, following the example previously given, had a comparative moisture absorption after 28 days of only 3.8%, even though cured in the air. Steam curing of the blocks was omitted. Blocks similarly produced in accordance with this invention, but using proportions of concrete varying from 3½ to 2½ bags of cement to the amount of aggregate given in Example 4 displayed moisture absorption characteristics, after 28 days, as follows:

| Bags of Cement | Moisture Absorption Percent after 28 days (average of 5 tests) |
| --- | --- |
| 3½ | 4.5 |
| 2½ | 4.9 |

This low moisture absorption of the blocks reveals or confirms a far greater hydration of the cement therein than the cement in the blocks conventionally produced, even though they were steam cured. It appears, therefore, that much of the cement in the concrete mixture prepared according to conventional practice remains unhydrated at the time of casting, but is available for hydration slowly over a period of time thereafter, whereas the greater state of initial hydration of the cement in blocks produced according to the invention confers a greater density upon the block, or at least substantially reduces the subsequent moisture absorption characteristics. In other words, there was less cement in such blocks to begin with, and what cement was present was hydrated more effectively.

When a block, after being cast, continues to undergo a change in the state of hydration of the cement therein, there is a commensurate change in block dimensions. Hydration is accompanied by physical changes which appear as dimensional changes in the finished block. Therefore, blocks in which the cement is only partially hydrated are physically unstable. In fact, it is generally recognized that physical change in the blocks in a wall or building structure, after the erection thereof, will or may cause undesirable cracks to develop. The blocks of the present invention, being physically stable to a much greater extent, are less subject to this defect.

From an economic point of view the elimination of a substantial proportion of a cement normally required results in substantial manufacturing savings. For example, based on present cement prices, a saving of 2 cents per block or more is realized. While the examples herein have been directed primarily to concrete blocks, it will be understood that the same principle may be employed in the manufacture of cinder blocks, or bricks, concrete pipes, and the like, as well as chemical pipeware and shapes wherein asbestos or other binder fibers are incorporated.

In the tests reported in the foregoing examples, the use of wetting agent deliberately was omitted. However, it has been determined that wetting agents when incorporated in slurries produced in accordance with the present invention confer unusually good results upon the properties of the finished concrete. Intensive mixing during slurry preparation enables better distribution of the wetting agent to be obtained with the result that the physical stability of the finished concrete and its moisture absorption characteristics are considerably better than in concretes made according to conventional procedure. In fact, intensive mixing during slurry preparation renders the wetting agent more effective than it is when mixed conventionally. It is to be understood, therefore, that the present invention contemplate a process wherein wetting agent may or may not be used, as desired.

Having described our invention, we claim:

1. The method of producing Portland cement concrete having a cement-water ratio of at least 30 pounds of water per each 94 pound bag of dry Portland cement, which method comprises first forming a crude mixture by commingling water and dry Portland cement in the proportion of not more than 28 pounds of water per each 94 pound bag of dry Portland cement, then subjecting the mixture to intensive mechanical working by operating a rotating turbulence impeller in the crude admixture at a high rate of speed for a period of time sufficient to increase the viscosity of the slurry and to disperse particles of cement in water, thereby producing a slurry which is of thick consistency, then adding additional water to the slurry prior to admixture of aggregate therewith, in amount sufficient to prcvide a water-cement ratio in the slurry of at least 30 pounds of water per each 94 pound bag of dry Portland cement, whereby the smaller amount of water present in the slurry during the said intensive mixing operation promotes dispersion and hydration of the particles of cement through increase in slurry viscosity and whereby the said later addition of water prior to commingling of aggregate material therewith provides the fluidity necessary to produce concrete of given workability characteristics when the finished slurry is admixed with aggregate material in intended proportion without impairing the ultimate set strength of such concrete, and finally producing concrete which is ready for use by commingling the slurry with aggregate material in the said intended proportion.

2. The method of producing Portland cement concrete having a cement-water ratio of at least 30 pounds of water per each 94 pound bag of dry Portland cement, which method comprises first forming a crude mixture by commingling water and dry Portland cement in the proportion of not more than 28 pounds of water per each 94 pound bag of dry Portland cement, then subjecting the mixture to intensive mechanical working by operating a rotating turbulence impeller in the crude admixture at a high rate of speed for a period of time sufficient to increase the viscosity of the slurry and to disperse particles of cement in water, thereby producing a slurry which is of relatively thick consistency, then progressively adding additional water to the slurry prior to admixture of aggregate therewith, in amount sufficient to procide a water-cement ratio in the slurry of at least 30 pounds of water per each 94 pound bag of dry Portland cement, whereby the smaller amount of water present in the slurry during the initial portion of said intensive mixing operation promotes dispersion and hydration of the particles of cement through increase in slurry viscosity and whereby the said later progressive addition of water prior to commingling of aggregate material therewith provides the fluidity necessary to produce concrete of given workability characteristics when the finished slurry is admixed with aggregate material in intended proportion without impairing the ultimate set strength of such concrete, and finally producing concrete which is ready for use by commingling the slurry with aggregate material in the said intended proportion.

3. The method of producing Portland cement concrete having a cement-water ratio of at least 30 pounds of water per each 94 pound bag of dry Portland cement, which method comprises first forming a crude mixture by commingling water and dry Portland cement in the proportion of not more than 28 pounds of water per each 94 pound bag of dry Portland cement, then subjecting the mixture to intensive mechanical working by operating a rotating turbulence impeller in the crude admixture at a high rate of speed for a period of time sufficient to increase the viscosity of the slurry and to disperse particles of cement in water, thereby producing a slurry which is of thick consistency and, at the end of said intensive mixing operation, but prior to admixture of aggregate with the slurry, reducing the viscosity of the slurry by adding an additional quantity of water in amount sufficient to provide a water-cement ratio in the slurry of at least 30 pounds of water per each 94 pound bag of dry Portland cement, whereby the smaller amount of water present in the slurry during the said intensive mixing operation promotes dispersion and hydration of the particles of cement through increase in slurry viscosity and whereby the said later addition of water prior to commingling of aggregate material therewith provides the fluidity necessary to produce concrete of given workability characteristics when the finished slurry is admixed with aggregate material in intended proportion without impairing the ultimate set strength of such concrete, and finally producing concrete which is ready for use by commingling the slurry with aggregate material in the said intended proportion.

4. The method of producing Portland cement concrete having a cement-water ratio of at least 30 pounds of water per each 94 pound bag of dry Portland cement, which method comprises first forming a crude mixture by commingling water and dry Portland cement in the proportion of not more than 28 pounds of water per each 94 pound bag of dry Portland cement, then subjecting the mixture to intensive mechanical working by operating a rotating turbulence impeller in the crude admixture at a high rate of speed for a period of time sufficient to increase the viscosity of the slurry and to disperse particles of cement in water, thereby producing a slurry which is of thick consistency, then adding additional water to the slurry prior to admixture of aggregate therewith, in amount sufficient to provide a water-cement ratio in the slurry of at least 38 pounds of water per each 94 pound bag of dry Portland cement, whereby the smaller amount of water present in the slurry during the said intensive mixing operation promotes dispersion and hydration of the particles of cement through increase in slurry viscosity and whereby the said later addition of water prior to commingling of aggregate material therewith provides the fluidity necessary to produce concrete of given workability characteristics when the finished slurry is admixed with aggregate material in intended proportion without impairing the ultimate set strength of such concrete, and finally producing concrete which is ready for use by commingling the slurry with aggregate material in the said intended proportion.

5. The method of producing Portland cement concrete having a cement-water ratio of at least 30 pounds of water per each 94 pound bag of dry Portland cement, which method comprises first forming a crude mixture by commingling water and dry Portland cement in the proportion of not more than 28 pounds of water per each 94 pound bag of dry Portland cement, then subjecting the mixture to intensive mechanical working for a period of time sufficient to increase the viscosity of the slurry and to disperse particles of cement in water, thereby producing a slurry which is of thick consistency, then adding additional water to the slurry prior to admixture of aggregate therewith, in amount sufficient to provide a water-cement ratio in the slurry of at least 30 pounds of water per each 94 pound bag of dry Portland cement, whereby the smaller amount of water present in the slurry during the said intensive mixing operation promotes dispersion and hydration of the particles of cement through increase in slurry viscosity and whereby the said later addition of water prior to commingling of aggregate material therewith provides the fluidity necessary to produce concrete of given workability characteristics when the finished slurry is admixed with aggregate material in intended proportion without impairing the ultimate set strength of such concrete, and finally producing concrete which is ready for use by commingling the slurry with aggregate material in the said intended proportion.

References Cited in the file of this patent

UNITED STATES PATENTS

| | | |
|---|---|---|
| 958,336 | Thomas | May 17, 1910 |
| 1,225,129 | Hochstrasser | May 8, 1917 |
| 1,259,462 | Chapman et al. | Mar. 12, 1918 |
| 1,318,282 | Johnson | Oct. 2, 1919 |
| 1,646,540 | Johnson | Oct. 25, 1927 |
| 1,660,242 | Thomson | Feb. 21, 1928 |
| 1,854,180 | Cross | Apr. 19, 1932 |
| 2,015,488 | Manabe | Sept. 24, 1935 |